(12) United States Patent
Yeu et al.

(10) Patent No.: US 6,750,297 B2
(45) Date of Patent: Jun. 15, 2004

(54) ARTIFICIAL PIGMENT AND METHOD FOR PREPARING THE SAME

(75) Inventors: Seung-Uk Yeu, Daejeon (KR); Ho-Yeul Choi, Daejeon (KR); Chang-Sun Han, Daejeon (KR); Wan-Sik Cha, Gwangmyung (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 10/182,438

(22) PCT Filed: Dec. 18, 2001

(86) PCT No.: PCT/KR01/02199

§ 371 (c)(1),
(2), (4) Date: Jul. 29, 2002

(87) PCT Pub. No.: WO02/50373

PCT Pub. Date: Jun. 27, 2002

(65) Prior Publication Data
US 2003/0008945 A1 Jan. 9, 2003

(30) Foreign Application Priority Data
Dec. 18, 2000 (KR) .......................................... 2000-77917

(51) Int. Cl.[7] .............................. C08F 2/22; C08F 285/00
(52) U.S. Cl. ....................... 525/243; 525/244; 525/237; 525/238; 525/241; 525/232; 525/309; 525/310; 523/201
(58) Field of Search ................................. 525/243, 244, 525/237, 238, 241, 232, 233, 309, 310; 523/201

(56) References Cited

U.S. PATENT DOCUMENTS

| 5,618,888 | A | * | 4/1997 | Choi et al. ................... 525/301 |
| 5,700,852 | A | | 12/1997 | Iwanaga et al. |
| 5,872,189 | A | | 2/1999 | Bett et al. |
| 6,342,550 | B1 | * | 1/2002 | Ishii et al. ................... 524/161 |

FOREIGN PATENT DOCUMENTS

DE  19512999 A1  10/1995

\* cited by examiner

Primary Examiner—James J. Seidleck
Assistant Examiner—Olga Asinovsky
(74) Attorney, Agent, or Firm—Birch, Stewart, Kolasch & Birch, LLP

(57) ABSTRACT

The present invention relates to an artificial pigment and a method of preparing the same, specifically, to an artificial pigment with excellent dry pick resistance and to a method of preparing the same. In order to accomplish the present invention, there is provided an artificial pigment of inverted core-shell structure comprising: a) a shell of butadiene polymer including: i) a seed of butadiene polymer having glass transition temperature of −10 to 50° C.; and ii) a seed covering of butadiene polymer having a glass transition temperature of −10 to 20° C.; and b) a core of styrene polymer having a glass transition temperature of 40 to 120° C. Also provided is method of preparing artificial pigment comprising: a) preparing a shell of butadiene polymer; and b) preparing a core of styrene polymer on the inner side of said shell of step a). The coating color comprising the artificial pigment of the present invention can make coated paper having excellent dry pick resistance anti high paper gloss and printing gloss as well as stiffness.

19 Claims, No Drawings

ARTIFICIAL PIGMENT AND METHOD FOR PREPARING THE SAME

This application is the national phase under 35 U.S.C. §371 of PCT International Application No. PCT/KR01/02199 which has an International filing date of Dec. 18, 2001, which designated the United States of America.

BACKGROUND OF THE INVENTION (a) Field of the Invention

The present invention relates to an artificial pigment, specifically to an artificial pigment with excellent dry pick resistance and to a method of preparing the same.

(b) Description of the Related Art

Conventional coated paper is manufactured by coating an inorganic pigment such as clay, calcium carbonate, aluminum hydroxide ($Al(OH)_3$), titanium oxide ($TiO_2$) on paper. In preparing coated paper, a natural binder such as casein or starch and an artificial binder such as styrene-butadiene latex, polyvinyl alcohol or acrylic latex are used as an adhesive. Also, many kinds of additives such as a dispersion agent, a thickener, or a water-resistance agent are used. However, the most important components in manufacturing coated paper are an inorganic pigment and a binder. In order to obtain balanced properties of coated paper, an appropriate inorganic pigment and a binder should be used.

The most commonly used inorganic pigments are clay and calcium carbonate. Clay having plate shape has merits of high paper gloss and printing gloss. Calcium carbonate has merits of fluidity, dry pick resistance, Ink set-off, brightness of paper, and opacity.

Besides the inorganic pigment, an artificial pigment can be used in order to obtain coated paper with high quality. Conventionally, a latex of styrene polymer or an acryl-styrene copolymer is used as an artificial pigment. The artificial pigment has very high glass transition temperature so that it can increase the paper gloss of coated paper, opacity and micro smoothness. However, since the artificial pigment has little dry pick resistance and high binder demand, if a sufficient amount of binder is not used, material properties such as dry pick resistance of coated paper and printing gloss can deteriorate.

Recently, in order to improve productivity and save drying energy, as high concentration of solid content of coating color proceeded, viscosity of a composition for paper coating increased. Because of this, fluidity of coated paper decreased and thus it brought a reduction of work-operation.

In addition, to increase the manufacturing speed of paper, there has been considerable research to improve productivity and to provide an increase in printed materials by increasing coating speed. When coating speed is increased, shear strength during coating also increases and thus high-shear fluidity becomes more important. A high-shear means a shear speed of more than one, one thousands of a second and a low-shear means a shear speed of less than one, one hundreds of a second. The low-shear viscosity affects the transfer of the coating color and the coating.

As mentioned above, there is a problem that low-shear/high-shear fluidity of the coating color is a previous requirement for a high concentration of coating color and an increase in coating speed. In order to solve the above problem, there are two solutions: one is replacing a natural soluble binder having a large thickening effect, such as starch or casein, with an artificial binder and the other is increasing the ratio of ground calcium carbonate with fine particles that has a lower viscosity in terms of a pigment. However, although calcium carbonate has many merits, it is unfavorable in terms of paper gloss, printing gloss and smoothness so that it is difficult to increase weight. Also fluidity problems can be solved by controlling particle size of a binder. As the particle size of a binder decreases, the high-shear viscosity is lowered. This principle is applicable to the artificial pigment. That is, fluidity can be controlled by changing the particle size of an artificial pigment used so that it is easier to cope with the high concentration and change of coating speed than that of using an inorganic pigment only.

In addition, the artificial pigment has a better water-retention property than an inorganic pigment. The water-retention property is a property of coating color to maintain moisture against exterior strength. When the water-retention property is low, the solid content of the coating color continuously increases during coating so that work-operation has problems and irregular binder distribution in the coating layer such as binder migration can occur. However, since an artificial pigment is conventionally more surface-hydrophilic than an inorganic pigment, the moisture-holding property is excellent and thus, the work-operation and the quality of coated paper can be improved.

Recently, due to an increase in printed materials, the tendency of using high-speed printing, particularly in offset printing is gradually increasing. Also, as a requirement of coating color, the importance of dry pick resistance and reduction of the binder content is continuously increasing. That is, the coated paper should resist strong mechanical strength against the surface of the coated paper of pigments in order not to incur picking from the coating layer and the falling off of pigment during printing. That is, the coated paper should have a clear printing appearance. Since the destruction of the paper surface is more severe as the printing speed is increased and content of binder is lowered, a pigment adhesive having excellent dry pick resistance is required in order to prevent the above problem.

In addition, the importance of ink set-off is increasing. Ink set-off is a property, which represents ink-drying speed after printing. In the case of multi-color printing, printing is usually done with four colors of blue, black, red, and yellow. As the ink set-off increases, the time period to print the next color can be short, thus it improves the productivity of the printing. If the ink is not well dried and goes to the next step, print mottle or a post-smear phenomenon can occur.

Gloss is an important factor to increase commercial value and quality of printing paper. Gloss is divided into paper gloss of coated paper and printing gloss after printing. As the value of both of these factors increases, the paper develops a good appearance. Conventionally, as the particle size of a binder used in the coating color is increased, the arrangement of the inorganic pigments is made easier, so that paper gloss increases. Also, as the glass transition temperature of the binder is increased, paper gloss increases. Another method increase paper gloss is to lower the content of the binder in the coating color. However, when the paper gloss is increased by only the above methods, the dry pick resistance is decreased.

Another method increase paper gloss is to use an artificial pigment. Although the conventional artificial pigment has a high glass transition temperature and can increase paper gloss, they have demerits of low dry pick resistance and printing gloss. In order to complement these demerits, there can be provided artificial pigment having dry pick resistance. But, such a pigment has a lower paper gloss than an artificial pigment having a high glass transition temperature, or it has a high paper gloss but insufficient dry pick resistance.

Meanwhile, in order to increase the printing gloss, the porosity should be lowered and thus, it is required to hold the solvent on the surface, until after printing, until stability is achieved. Thus small particle size of the binder, a low glass transition temperature and a high binder content of the coating color are desired. In this case, ink set-off should be lowered. Also, when an artificial pigment having high glass transition temperature is used, since porosity increases, printing gloss reduces.

In addition, wet-pick resistance is also an important printing property in offset printing. In the offset printing, damping water is used. If the wet-pick resistance decreases, pigments can be exfoliated by the application of a strong physical strength during printing.

Another printing property required in offset printing is wet ink receptivity. As described above, since damping water is used in the offset printing, if the coated paper does not effectively absorb water during printing, ink that does not have compatibility with water will not adhere to the coated paper well, which results in a low degree of printing. Generally, wet ink receptivity and wet-pick resistance are opposite properties so that it is difficult to increase both of them simultaneously.

With an increasing tendency of using high quality magazines and mail-order catalogues, there is an increasing demand for a low-weight coated paper. A low-weight coated paper has a lower coating amount and is thinner and lighter than middle or high-weight paper so that it needs to have excellent stiffness and high paper gloss and printing gloss in order to have a high quality. Thus, the coating color used in low-weight paper may have a different composition from that of general coated paper and the binder used also has a higher glass transition temperature than the usual binder. Particularly, when the amount of an artificial pigment increases, higher stiffness can be obtained. However, since dry pick resistance reduces significantly, an artificial pigment having dry pick resistance can be used in order to complete the demerit. However, since an artificial pigment having dry pick resistance has a low glass transition temperature, stiffness and paper gloss is somewhat reduced.

As above, it is very difficult to prepare a coating color that can provide a coated paper with excellent printing properties. Also, coating and printing circumstances are becoming more strict.

SUMMARY OF THE INVENTION

Considering the above problems of the prior art, the present invention provides an artificial pigment having excellent fluidity, paper gloss, stiffness, dry pick resistance, ink set-off and printing gloss.

In order to achieve the above object, the present invention provides an artificial pigment of inverted core-shell structure comprising;
 a) a shell of butadiene polymer including:
  i) a seed of butadiene polymer having a glass transition temperature of −10 to 50° C.; and
  ii) a seed covering of butadiene polymer having a glass transition temperature of −10 to 20° C.; and
 b) a core of styrene polymer having a glass transition temperature of 40 to 120° C.

Also, the present invention provides a method of preparing artificial pigment comprising:
 a) preparing shell of butadiene polymer; and
 b) preparing core of styrene polymer on the inner side of said shell of a) step.

More specifically, the present invention provides a method of preparing artificial pigment comprising:
 a) a step of preparing shell comprising
  i) preparing seed latex by emulsion polymerizing seed composition comprising styrene, 1,3-butadiene, ethylenic unsaturated acid monomer, vinyl cyanide monomer, monomer copolymerizable with these, and a chain transfer agent; and
  ii) covering outside of said seed latex with polymer of seed covering composition by adding seed covering composition comprising styrene, 1,3-butadiene, ethylenic unsaturated acid monomer and a chain transfer agent to said seed latex and emulsion polymerizing them; and
 b) a step of preparing core inside of said shell by adding core composition comprising styrene and ethylenic unsaturated acid monomer to said shell and emulsion polymerizing them.

Also, the present invention provides a coated paper composition comprising the artificial pigment.

In addition, the present invention provides a paper coated with the paper coating composition.

DETAILED DESCRIPTION OF THE PREFERRED EMBODIMENTS

Hereinafter, the present invention will be explained in detail.

As a result of extensive research in the need of a new coating color, the present inventors have found that the above object can be accomplished by distributing butadiene having dry pick resistance to the surface of an artificial pigment with a new method different from the prior art. That is, after preparing latex by using butadiene having low glass transition temperature, styrene having high glass transition temperature is controlled to react inside, not on the latex surface, so that both paper gloss and dry pick resistance of coated paper can be satisfied. Thus, the present invention was accomplished based on this.

The artificial pigment of the present invention has an inverted core-shell structure that has different morphology from the prior art and is a polymer prepared from reacting latex made from butadiene with styrene having high glass transition temperature. The artificial pigment of the present invention shows high paper gloss and printing gloss while having more excellent dry pick resistance than other known artificial pigment, and improves dry pick resistance while maintaining stiffness.

In addition, the artificial pigment of the present invention can prepare aqueous coating color by mixing with an inorganic pigment, a binder, a thickener, and the other additives and thus high quality coated paper can be made by coating the coating color on paper. The inorganic pigment is a pigment such as titanium oxide, calcium carbonate, or clay and a pigment extender and so on. The amount of the artificial pigment is preferably 3 to 20 parts by weight based on 100 parts by weight of inorganic pigments.

The artificial pigment of the present invention comprises a shell polymerization step and core polymerization step that forms the core inside of the shell, more specifically, a triple-structure comprising a seed-preparing step as a first polymerization; a shell-preparing step that forms a covering on the seed as a second polymerization; and a core-polymerizing step that forms a core inside of the shell as a third polymerization and each step is formed by emulsion polymerization.

The seed prepared through the first step is characterized in having a low gel content and appropriate hydrophilicity; the second polymerization is characterized in having a low glass transition temperature and gel content and high hydrophilicity as well as a long polymerization time; and the third polymerization is characterized in having a monomer composition that is higher in glass transition temperature and lower in hydrophilicity than the second polymerization and a short polymerization time. Also, the third polymerization is characterized in penetrating into the latex prepared from the second polymerization to perform reaction. Thus, the artificial pigment of the present invention is prepared by effectively controlling gel content, hydrophilicity and polymerization time in each step so that the artificial pigment has a new structure, that is, the second polymer forms outer shell of the artificial pigment and the third polymer forms inner shell.

The preparation processes of the artificial pigment of the present invention will be explained in detail.

The first step is an initial polymerization process of seed. The seed comprises 35 to 90 parts by weight of styrene, 10 to 55 parts by weight of 1,3-butadiene, 1 to 18 parts by weight of ethylenic unsaturated acid and 0.5 to 15 parts by weight of vinyl cyanide monomer.

Styrene gives the copolymer appropriate hardness and wet pick resistance. When styrene is less than 35 parts by weight, a sufficient hardness and wet pick resistance cannot be obtained. The other hand, when styrene is more than 90 parts by weight, dry pick resistance and film strength is lowered.

1,3-butadiene gives the copolymer flexibility. When 1,3-butadiene is less than 10 parts by weight, the polymer becomes too stiff and when it is more than 55 parts by weight, stiffness is lowered.

The ethylenic unsaturated acid monomer is appropriately used for improving dry pick resistance of polymer and stability of latex particles. The composition ratio of ethylenic unsaturated acid monomer is preferably 1.5 to 18 parts by weight. When the amount is less than 1 part by weight, the above effect cannot be obtained and when the amount is more than 18 parts by weight, a problem such as polymerization stability can occur. The ethylenic unsaturated acid monomer is preferably unsaturated carboxylic acid or unsaturated polycarboxylic acid alkyl ester having at least one carboxylic acid.

The unsaturated carboxylic acid is preferably at least one selected from the group consisting of methacylic acid, acrylic acid, itaconic acid, chrotonic acid, fumaric acid, and maleinic acid and the unsaturated polycarboxylic.acid alkyl ester is preferably at least one selected from the group consisting of monoethyl itaconate, monobutyl fumarate and monobutyl malate.

The vinyl cyanide monomer improves printing gloss and the amount of it is preferably 3 to 10 parts by weight. Also, since the vinyl cyanide monomer has high hydrophilicity with ethylenic unsaturated acid monomer, it is preferable to control hydrophilicity within preferable amount in each polymerization step. The vinyl cyanide monomer is preferably acrylonitrile or methacylonitrile.

The seed preparation step of the present invention comprises styrene, 1,3-butadiene, ethylenic unsaturated acid monomer and 1 to 25 parts by weight of a monomer copolymerizable with vinyl cyanide monomer and 0.1 to 1.0 parts by weight of a chain transfer agent.

The copolymerizable monomer is preferably at least one selected from the group consisting of unsaturated carboxylic acid alkyl ester such as methylacrylate, methylmethacrylate, ethylacrylate, ethylmethacrylate, butylacrylate, or butylmethacrylate; unsaturated carboxylic acid hydroxyalkyl ester such as β-hydroxyethyl acrylate, β-hydroxypropyl acrylate, or β-hydroxyethyl methacrylate; unsaturated carboxylic acid amide such as acrylamide, methacrylamide, itaconamide, or maleic acid monoamide or derivatives thereof; and aromatic vinyl monomer such as α-methylstyrene, vinyl toluene, or p-methyl styrene. The unsaturated carboxylic acid alkyl ester gives the copolymer an appropriate hardness and improves film formability. When the amount is more than 25 parts by weight, it adversely affects wet pick resistance so that it is preferable to have 3 to 15 parts by weight. In addition, the unsaturated carboxylic acid amide and derivatives thereof have an improving effect for chemical stability, mechanical stability and wet pick resistance of copolymer latex and the amount is preferably 1 to 10 parts by weight.

The chain transfer agent of the present invention is preferably selected from the group consisting of mercaptan such as n-dodecyl mercaptan or t-dodecyl mercaptan.

The seed preparation of the present invention is performed by emulsion polymerization under the addition of additives such as a conventional polymerization initiator, an emulsifier, or an electrolyte to the above seed composition.

The seed of the artificial pigment of the present invention has preferably less than 80% by weight of gel content, more preferably 20 to 60% by weight. When gel content of seed is more than 80% by weight, the second and third polymerization steps followed by the seed preparation step cannot control structure so that sufficient dry pick resistance cannot be obtained.

The second step of the artificial pigment preparing steps of the present invention is a covering step of shell on the seed latex prepared from the first step. The composition comprises 20 to 85 parts by weight of styrene, 23 to 75 parts by weight of 1,3-butadiene, 0.5 to 18 parts by weight of ethylenic unsaturated acid monomer, and 0.1 to 3.0 parts by weight of a chain transfer agent. Also, it can further comprise 1.0 to 20 parts by weight of vinyl cyanide monomer, and 0.1 to 25 parts by weight of monomers copolymerizable with other monomers.

The shell prepared from the second step of the present invention preferably comprises 25 to 65% by weight of gel content, more preferably 40 to 55% by weight. When the gel content is less than 25% by weight, gloss and polymerization stability can be lowered and when the gel content is more than 65% by weight, the monomer of the third step cannot effectively penetrate into polymer inside of the second step so that dry pick resistance reduces.

The third step of the artificial pigment preparing steps is performed by adding new monomers and polymerizing them when the conversion ratio of monomer to polymer in the second step is 55 to 85%. If the conversion ratio is less than 55%, monomers in the second step and monomers in the third step are mixed and their structures are not apparently separated, so that paper gloss and stiffness can be lowered. If the conversion ratio is more than 85%, effective inverted core-shell structure cannot be obtained so that dry pick resistance reduces.

The monomer composition of the third step comprises preferably 85 to 99.9 parts by weight of styrene, and 0.1 to 15 parts by weight of ethylenic unsaturated acid monomer. It can further comprise 0.1 to 25 parts by weight of 1,3- butadiene, 0.1 to 1.0 parts by weight of a chain transfer agent, 0.1 to 10 parts by weight of vinyl cyanide monomer, and 0.1 to 8 parts by weight of copolymerizable monomer in addition to the styrene and ethylenic unsaturated acid monomer.

Each monomer used in the second step and the third step is the same as the material used in the first step of seed preparation.

In addition, core after the third step has preferably 40 to 85% by weight of gel content, more preferably 55 to 78% by weight. When the gel content is less than 40% by weight, molecular weight is reduced so that dry pick resistance reduces. When the gel content is more than 85% by weight, effective control of structure is difficult and film-formability is reduced so that dry pick resistance can be lowered.

Also, it is very important for the artificial pigment of the present invention to control thickness and glass transition temperature in each step during process. The thickness in each step can be regulated by controlling seed content and monomer content. If it is not properly regulated, the artificial pigment with preferable structure cannot be obtained. In addition, if glass transition temperature in each process is properly regulated, printing properties, such as dry pick resistance, printing gloss, and ink set-off and other properties such as paper gloss and stiffness can be effectively controlled.

A proper average particle size of the first step after seed polymerization during process is preferably 50 to 90 nm, more preferably 55 to 80 nm, a proper average particle size after the second step is preferably 130 to 260 nm, more preferably 150 to 240 nm, and an average particle size of the artificial pigment after the third step is preferably 170 to 300 nm, more preferably 190 to 260 nm.

In addition, proper glass transition temperature of seed of the first step is preferably −10 to 50° C., more preferably −5 to 30° C., glass transition temperature of the shell polymer prepared from the second step is preferably −10 to 20° C., more preferably −5 to 10° C., and glass transition temperature of core polymer prepared from the third step is 40 to 120° C., more preferably 60 to 120° C.

Even though it is difficult to show the final glass transition temperature after completion of polymerization as a specific value, it is theoretically 20 to 60° C., more preferably 30 to 50° C. When the temperature is less than 20° C., paper gloss and stiffness is lowered, and when the temperature is more than 60° C., dry pick resistance reduces.

In addition, polymerization temperature and time in the second and third steps during preparation of the artificial pigment of the present invention have very important role to control the structure of the artificial pigment. The polymerization temperature and time should be preferably controlled together to maintain a balance of thermodynamic preference and dynamic speed. Particularly, the polymerization temperature and time of the third step should be controlled to have 50 to 85% of conversion ratio right after the third step in order to obtain inverted core-shell structure. Other reaction conditions, such as a polymerization initiator, an emulsifier, and an electrolyte are the same as the known art in an emulsion polymerization.

In the artificial pigment of the present invention, polymer of the third step is formed inside of latex, not surface of latex and polymer of the second step forms a shell. That is, polymer of the second step having good dry pick resistance exists on the surface of latex prepared from the first step and polymer of the third step having good stiffness exists inside of latex so that the artificial pigment having excellent dry pick resistance and paper gloss can be obtained.

Hereinafter, preferable examples and comparative examples are presented for the sake of understanding. These examples, however, are provided to facilitate the understanding and the present invention is not limited to the following examples.

EXAMPLE 1–12

The artificial pigment of the present invention was prepared according to the following three steps.

First step; 10L-pressure reactor equipped with a stirrer, a thermometer, a cooler, and an inlet of nitrogen gas and equipped so as to continuously provide monomers, emulsifiers and a polymerization initiator was purged with nitrogen and then 33 parts by weight of butadiene, 49 parts by weight of styrene, 8 parts by weight of methylmethacrylate, 5 parts by weight of acrylonitrile, 5 parts by weight of itaconic acid, 6 parts by weight of dodecyl dibenzene sulfonic acid, 0.3 parts by weight of t-dodecyl mercaptan, 0.4 parts by weight of sodium bicarbonate and 420 parts by weight of ion exchange water were added thereto and heated to 60° C. Thereto, 1 part by weight of potassium persulfate as a polymerization initiator was added and stirred for about 300 minutes to complete polymerization of seed.

As a result of analyzing by a Laser Scattering Analyzer (Nicomp), the obtained seed has an average particle size of 68 nm, 53% of gel content, and 97% of conversion ratio.

Second step: In order to cover the shell into the above seed obtained from the first step, seed latex and 32 parts by weight of ion exchange water were added into the reactor and heated to 80° C. The components of table 1 except seed latex were continuously added for 150 minutes to polymerize them. The below unit is parts by weight and total amount of monomers of the second and third steps are 100 as a standard.

TABLE 1

| Components | Ex 1 | Ex. 2 | Ex. 3 | Ex 4 | Ex. 5 | Ex. 6 | Ex. 7 | Ex. 8 | Ex. 9 | Ex. 10 | Ex. 11 | Ex 12 |
|---|---|---|---|---|---|---|---|---|---|---|---|---|
| Seed latex | 8 | 8 | 8 | 8 | 28 | 28 | 8 | 8 | 8 | 28 | 28 | 28 |
| Butadiene | 15 | 15 | 20 | 24 | 20 | 20 | 15 | 24 | 20 | 24 | 30 | 15 |
| Styrene | 27 | 22 | 22 | 20.5 | 22 | 17 | 17 | 13 | 10 | 16 | 11.5 | 12 |
| Methylmethacrylate | 0 | 5 | 0 | 6 | 0 | 10 | 10 | 10 | 0 | 0 | 10 | 10 |
| Acrylonitrile | 5 | 5 | 5 | 6 | 5 | 0 | 5 | 0 | 10 | 0 | 5 | 10 |
| Itaconic acid | 1.5 | 1 | 1 | 1.4 | 1.5 | 1.5 | 1.5 | 1.5 | 5 | 5 | 1.4 | 1.5 |
| Acrylic acid | 1 | 1.5 | 1.5 | 1.5 | 1 | 1 | 1 | 1 | 3 | 3 | 1.5 | 1 |
| Acrylamide | 0.5 | 0.5 | 0.5 | 0.6 | 0.5 | 0.5 | 0.5 | 0.5 | 2 | 2 | 0.6 | 0.5 |
| t-dodecyl mercaptan | 0.42 | 0.62 | 0.72 | 0.92 | 0.92 | 0.72 | 0.42 | 0.92 | 0.92 | 0.92 | 1.18 | 0.42 |

Besides the above table 1, 0.75 parts by weight of sodium dodecyl dibenzene sulfonic acid, 0.25 parts by weight of sodium bicarbonate, 32.5 parts by weight of ion exchange water, 1.5 parts by weight of potassium persulfate were continuously added in Examples 1, 2, 3, 5, 6, 7, 8, 9, 10 and 12. In case of Examples 4 and 11, 0.9 parts by weight of sodium dodecyl dibenzene sulfonic acid, 0.3 parts by weight of sodium bicarbonate, 39 parts by weight of ion exchange water, and 16 parts by weight of potassium persulfate were continuously added. After adding all the components, they were further stirred for 10 minutes. The conversion ratio was 65 to 80%.

Third step:

After maintaining temperature of the reactor filled with the latex obtained from the second step as 80° C., the components of table 2 were continuously added for 100 minutes to polymerize. The below unit is parts by weight and total amount of monomers of the second and third steps are 100 as a standard.

TABLE 2

| Components | Ex. 1 | Ex 2 | Ex 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| butadiene | 5 | 0 | 0 | 0 | 5 | 0 | 10 | 0 | 0 | 4 | 0 | 10 |
| Styrene | 39 | 48 | 48 | 38.5 | 43 | 43 | 30.5 | 48 | 48 | 37 | 38.5 | 38 |
| Methylmethacrylate | 2 | 0 | 0 | 0 | 0 | 0 | 2 | 0 | 0 | 4 | 0 | 0 |
| Acrylonitrile | 2 | 0 | 0 | 0 | 0 | 5 | 2 | 0 | 0 | 5 | 0 | 0 |
| acrylic acid | 1.5 | 1.5 | 1.5 | 1.1 | 1.5 | 1.5 | 5 | 1.5 | 0 | 0 | 1.1 | 1.5 |
| Acrylamide | 0.5 | 0.5 | 0.5 | 0.4 | 0.5 | 0.5 | 0.5 | 0.5 | 0 | 0 | 0.4 | 0.5 |
| t-dodecyl mercaptan | 0.2 | 0 | 0.2 | 0 | 0 | 0.2 | 0.3 | 0 | 0 | 0.1 | 0 | 0.3 |

Besides the above table 2, 0.75 parts by weight of sodium dodecyl dibenzene sulfonic acid, 0.25 parts by weight of sodium bicarbonate, 32.5 parts by weight of ion exchange water, 0.5 parts by weight of potassium persulfate were continuously added in Examples 1, 2, 3, 5, 6, 7, 8, 9, 10 and 12. In case of Examples 4 and 11, 0.6 parts by weight of sodium dodecyl dibenzene sulfonic acid, 0.2 parts by weight of sodium bicarbonate, 26 parts by weight of ion exchange water, and 0.4 parts by weight of potassium persulfate were continuously added.

After adding all the components, they were further stirred for 100 minutes while elevating temperature to 90° C. to complete polymerization. The conversion ratio of the artificial pigment was 98 to 100% and the average particle sizes were measured as 240 nm in Examples 1, 2, 3, 4, 7, 8 and 9 and as 170 nm in Examples 5, 6, 10, 11 and 12.

Comparative Examples

First step:

The seed latex was prepared by the same method of Examples.

Second step:

A determined amount of seed latex and 32 parts by weight of ion exchange water were added into a reactor and heated to 80° C. The components of table 3 were continuously added for 100 minutes to polymerize. The below unit is parts by weight and it is conversed by the same standard as the Examples.

TABLE 3

| Components | Com. Ex. 1 | Com. Ex.2 | Com. Ex. 3 |
|---|---|---|---|
| Seed latex | 8 | 8 | 28 |
| Butadiene | 0 | 0 | 0 |
| styrene | 48 | 48 | 48 |
| methylmethacrylate | 5 | 0 | 0 |
| Acrylonitrile | 0 | 0 | 0 |
| Acrylic acid | 1.5 | 1.5 | 1.5 |
| Acrylamide | 0.5 | 0.5 | 0.5 |

Besides the above table 3, 0.75 parts by weight of sodium dodecyl dibenzene sulfonic acid, 0.25 parts by weight of sodium bicarbonate, 32.5 parts by weight of ion exchange water, 1.5 parts by weight of potassium persulfate were continuously added in Comparative Examples 1 to 3. After adding all the components, they were further stirred for 10 minutes. The conversion ratio was 85 to 95%.

Third step:

After maintaining temperature of the reactor filled with the latex obtained from the second step as 80° C., the components of table 4 were continuously added for 150 minutes to polymerize. The below unit is parts by weight and it is conversed by the same standard as the Examples.

TABLE 4

| Components | Com. Ex 1 | Com. Ex. 2 | Com Ex. 3 |
|---|---|---|---|
| butadiene | 0 | 20 | 20 |
| Styrene | 42 | 17 | 17 |
| methylmethacrylate | 0 | 5 | 5 |
| Acrylonitrile | 5 | 5 | 5 |
| Itaconic acid | 1.5 | 1.5 | 1.5 |
| Acrylic acid | 1 | 1 | 1 |
| Acrylamide | 0.5 | 0.5 | 0.5 |
| t-dodecyl mercaptan | 0 | 0.5 | 0.7 |

Besides the above table 4, 0.75 parts by weight of sodium dodecyl dibenzene sulfonic acid, 0.25 parts by weight of sodium bicarbonate, 32.5 parts by weight of ion exchange water, 0.5 parts by weight of potassium persulfate were continuously added in Comparative Examples 1 to 3.

After adding all the components, the reaction was facilitated to elevate temperature to 90° C. and the polymerization was completed by further stirring for 60 min in case of Comparative example 1 and for 150 min in case of Comparative Examples 2 and 3. The conversion ratio of the artificial pigment completed polymerization was 98 to 100% and average particle sizes were 240 nm in Comparative Examples 1 and 2 and 170 nm in Comparative Example 3

EXAMPLE 13

In order to compare and evaluate the pigments of examples and comparative examples, paper coating color containing 64% by weight of solid content was prepared by using 40 parts by weight of standard clay(primary level), 40 parts by weight of calcium carbonate, 20 parts by weight of artificial pigment, 10 parts by weight of latex, 0.8 parts by weight of thickener, 1.2 parts by weight of other additives. The prepared coating color was coated on both sides of coated paper in each amount of 15 g/m$^2$ by a Rod manual coating(No.6). And then, the coating color was dried for 30 seconds at 105° C. and passed through a super calendar at 80° C. and under 40 kg/cm twice(pass speed:4 m/min) to make coated paper.

The material properties of the coated paper made in the above were measured in terms of low-shear viscosity, high-shear viscosity, stiffness, smoothness, paper gloss, printing gloss, dry pick resistance, ink set-off, wet pick resistance, and wet ink receptivity. The measurement methods were explained in below and the results were shown in table 5.

sured by the same method as that of dry pick resistance in terms of the degree of tear. The value was measured by 5-score method by using ink of tech value 14 after printing one time.

After printing coated paper in the RI printer, ink set-off was measured in terms of the degree of smear by 5-score method. As the score is higher, the ink set-off is better.

After adding damping water in the RI printer and printing, the wet ink receptivity was measured in terms of degree of transfer of ink. Ink of low tech value was used in order not to occur tear. As the score is higher, the wet ink receptivity is higher.

The paper gloss was measured after measuring various parts of coated paper by using an Optical Gloss Meter (HUNTER type, 75° gloss) and averaged. The unit is %.

The printing gloss was measured in the same method as in the paper gloss after 24 hours after printing in the RI printer.

TABLE 5

| Properties | Low-shear viscosity | High-shear viscosity | Stiffness | Smoothness | Paper gloss | Printing gloss | dry pick resistance | Ink set-off | Wet pick resistance | Wet ink receptivity |
|---|---|---|---|---|---|---|---|---|---|---|
| Ex. 1 | 1450 | 20.7 | 6.6 | 0.98 | 79.2 | 82.0 | 3.8 | 4.1 | 4.0 | 4.0 |
| Ex. 2 | 1490 | 21.3 | 6.8 | 0.92 | 82.7 | 84.2 | 3.9 | 4.3 | 4.2 | 3.8 |
| Ex. 3 | 1485 | 21.7 | 6.7 | 0.93 | 82.3 | 88.06 | 4.2 | 4.0 | 4.1 | 4.0 |
| Ex. 4 | 1490 | 21.6 | 6.5 | 0.95 | 81.5 | 88.2 | 4.3 | 3.8 | 3.9 | 4.1 |
| Ex. 5 | 1510 | 19.5 | 6.3 | 0.98 | 81.1 | 86.4 | 3.9 | 4.0 | 3.9 | 4.1 |
| Ex. 6 | 1510 | 19.8 | 6.4 | 0.96 | 83.1 | 85.9 | 3.7 | 4.3 | 4.2 | 3.8 |
| Ex. 7 | 1505 | 22.1 | 6.3 | 0.99 | 79.6 | 84.1 | 4.0 | 4.1 | 3.9 | 4.0 |
| Ex. 8 | 1495 | 21.5 | 6.8 | 0.93 | 82.0 | 89.1 | 4.3 | 3.9 | 4.0 | 3.9 |
| Ex. 9 | 1500 | 21.9 | 6.9 | 0.90 | 82.36 | 88.8 | 4.2 | 4.0 | 4.1 | 4.0 |
| Ex. 10 | 1515 | 19.4 | 6.2 | 0.99 | 80.7 | 85.8 | 4.0 | 4.0 | 3.8 | 4.1 |
| Ex 11 | 1510 | 19.4 | 6.3 | 0.95 | 81.8 | 88.0 | 4.1 | 3.9 | 3.8 | 4.0 |
| Ex. 12 | 1505 | 19.8 | 6.1 | 0.98 | 81.2 | 84.5 | 3.6 | 4.2 | 4.2 | 3.8 |
| Com. Ex. 1 | 1440 | 21.1 | 6.9 | 0.91 | 83.4 | 83.9 | 2.8 | 4.5 | 4.3 | 3.7 |
| Com. Ex. 2 | 1480 | 22.3 | 6.1 | 1.02 | 76.8 | 80.7 | 3.3 | 4.1 | 3.8 | 4.2 |
| Com. Ex. 3 | 1515 | 19.8 | 6.0 | 1.04 | 78.0 | 81.6 | 3.2 | 4.2 | 3.9 | 4.1 |

The low-shear viscosity was measured by a BF-type viscometer after 1 minute at 60 rpm by using a No.3 rotor and indicated by value (unit: cP) and the high-shear viscosity was measured by using a Hercules viscometer (KRK type, model KC-801C) at 6600 rpm and indicated by value (unit: cP).

The smoothness was measured by using a Parker print and as the value is smaller (unit: um), the surface of coated paper is smoother.

The stiffness was measured at both cross direction and machine direction by using a bending resistance tester (Gurley) and averaged. The measuring length is 2.5", width is 1", and as the value is higher, the coated paper is stiffer.

After printing coated paper several times in a RI printer, the dry pick resistance was measured by naked eyes in terms of the degree of tear and evaluated by 5-score method. As the score increases, dry pick resistance becomes better. After ink of tech value 12, 14, and 16 was used and measured, an average was obtained.

After adding damping water by using molten-roll in the RI printer and printing, the wet pick resistance was mea- As can be seen in the table 5, as a results of measuring properties of coating color and coated paper and printing properties, it can be confirmed that the artificial pigments of examples have more excellent and balanced printing properties than those of Comparative Examples. In Comparative example 1, paper gloss was excellent, but printing gloss and dry pick resistance were low. In Comparative Examples 2 and 3, paper gloss and printing gloss were lowered.

In addition, more or less changes of properties were indicated by changing conditions of the second and third step. This could be because particle size, gel content and monomer composition affect the structure of the present invention.

As mentioned above, the artificial pigment of present invention has an inverted core-shell structure and the an artificial pigment is used with an inorganic pigment to prepare coating color. The coating color comprising the artificial pigment can produce coated papers and has excellent properties in terms of low-shear viscosity, high-shear viscosity, stiffness, smoothness, paper gloss, printing gloss, dry pick resistance, ink set-off, wet pick resistance, and wet ink receptivity.

What is claimed is:

1. A polymer of an inverted core-shell structure for an artificial pigment comprising:
   a) a shell of butadiene polymer including:
      i) a seed of butadiene polymer having a glass transition temperature of −10 to 50° C.; and
      ii) a seed covering of butadiene polymer having a glass transition temperature of −10 to 20° C.; and
   b) a core of styrene polymer having a glass transition temperature of 40 to 120° C.,
   wherein the artificial pigment is prepared by an inverted core-shell polymerization wherein the shell is formed and then the core is formed inside of the shell.

2. The polymer of claim 1, wherein the
   seed of butadiene polymer is a polymer of a seed composition comprising styrene, 1,3-butadiene, an ethylenic unsaturated acid monomer, a vinyl cyanide monomer, a monomer copolymerizable with these and a chain transfer agent;
   the seed covering which is a polymer of a seed composition comprising styrene, 1,3-butadiene, an ethylenic unsaturated acid monomer and a chain transfer agent; and
   the core is a polymer of a core composition comprising styrene and ethylenic Unsaturated monomers, said core being disposed inside of said shell.

3. The polymer of claim 2, wherein said the seed is a butadiene polymer is a polymer of a composition comprising:
   35 to 90 parts by weight of styrene,
   10 to 55 parts by weight of 1,3-butadiene,
   1 to 18 parts by weight of an ethylenic unsaturated acid monomer,
   0.5 to 15 parts by weight of a vinyl cyanide monomer,
   1 to 25 parts by weight of a copolymerizable monomer and
   0.1 to 1.0 parts by weight of a chain transfer agent.

4. The polymer of claim 2, wherein
   said ethylenic unsaturated acid monomer of said butadiene polymer is selected from, the group consisting of methacrylic acid, acrylic cid, itaconic acid, chrotonic acid, furumalic acid, and maleic acid;
   said vinyl cyanide monomer is acrylonitrile or methacrylonitrile,
   said copolymerizable monomer is at least one selected from the group consisting of an unsaturated carboxylic acid alkyl ester, an unsaturated carboxylic acid hydroxyalkyl ester or derivatives thereof, and an aromatic vinyl monomer.

5. The polymer of claim 2, wherein said seed covering is a polymer of a seed composition comprising:
   20 to 85 parts by weight of styrene,
   23 to 75 parts by weight of 1,3-butadiene,
   0.5 to 18 parts by weight of an ethylenic unsaturated acid monomer, and
   0.1 to 3.0 parts by weight of a chain transfer agent.

6. The polymer of claim 5, wherein said seed covering composition further comprises:
   1.0 to 25 parts by weight of vinyl cyanide monomer; or
   1.0 to 25 parts by weight of at least one copolymerizable mononer selected from the group consisting of an unsaturated carboxylic acid alkyl ester, an unsaturated carboxylic acid hydroxyalkyl ester unsaturated carboxylic acid amide or derivatives thereof, and an aromatic vinyl monomer.

7. The polymer of claim 2, wherein said ethylenic unsaturated acid monomer of said seed covering is selected from the group consisting of methacrylic acid, acrylic acid, itaconic acid, chrotonic acid, furumalic acid and maleic acid.

8. The polymer of claim 2, wherein said core composition of comprises:
   85 to 99.9 parts by weight of styrene, and
   0.1 to 15 parts by weight of an ethylenic unsaturated acid monomer selected from the group consisting of methacrylic acid, acrylic acid, itaconic acid, chrotonic acid, furumalic acid and maleic acid.

9. The polymer of claim 2, wherein said core composition further comprises:
   0.1 to 25 parts by weight of 1,3-butadiene;
   0.1 to 1.0 parts by weight of a chain transfer agent;
   0.1 to 10 parts by weight of a vinyl cyanide monomer
   0.1 to 8 parts by weight of at least one copolymerizable monomer selected from the group consisting of an unsaturated carboxylic acid alkyl ester, an unsaturated carboxylic acid hydroxyalkyl ester unsaturated carboxylic acid amide or derivatives thereof, and an aromatic vinyl monomer.

10. The polymer of claim 1, wherein said polymer has an average particle size of 170 to 300 nm.

11. A method of preparing for an artificial pigment comprising:
    a) preparing a shell of butadiene polymer; and
    b) preparing a core of styrene polymer inside of said shell prepared in step a).

12. The method of claim 11 comprising:
    a) a step of preparing a shell comprising
       i) preparing a seed latex by emulsion polymerizing a seed composition comprising styrene, 1,3-butadiene, an ethylenic unsaturated acid monomer, a vinyl cyanide monomer, a monomer copolymerizable with these, and a chain transfer agent; and
       ii) covering the outside of said seed latex with a polymer of a seed covering composition by adding a seed covering composition comprising styrene, 1,3-butadiene, an ethylenic unsaturated acid monomer and a chain transfer agent to said seed latex and emulsion polymerizing them; and
    b) preparing a core inside of said shell by adding a core composition comprising styrene and an ethylenic unsaturated acid monomer to said shell and emulsion polymerizing them.

13. The method of claim 12, wherein the gel content of the seed particle after step a) i) is less than or to 80% by weight; the gel content of the shell particle after step a) ii) is 25 to 65% by weight; and the gel content of the core-shell particle after step b) is 40 to 85% by weight.

14. The method of claim 12, wherein the conversion ratio of monomer to polymer of the shell in step a) is 55 to 85% and the conversion ratio of monomer to polymer of the core-shell in step b) is 50 to 85%.

15. A paper coating composition comprising the polymer prepared by the method of claim 11.

16. A coated paper prepared by coating the paper coating composition comprising the polymer prepared by the method of claim 11 on a paper.

17. The polymer of claim 4, wherein
    said unsaturated carboxylic acid alkyl ester of said copolymerizable monomer is selected from the group consisting of methylacrylate, methylmethacrylate, ethylacrylate, ethylmethacrylate, butylacrylate, and butylmethacrylate;

said unsaturated carboxylic acid hydroxyalkyl ester of said copolymerizable monomer is selected from the group consisting of β-hydroxyethyl acrylate, β-hydroxypropyl acrylate, and β-hydroxyethyl methacrylate;

said unsaturated carboxylic acid amide of said copolymerizable monomer is selected from the group consisting of acrylamide, methacrylamide, itaconamide, maleic acid monoamide and derivatives thereof; and said aromatic vinyl monomer of said copolymerizable monomer is selected from the group consisting of α-methylstyrene, vinyl toluene, and p-methyl styrene.

18. The polymer of claim 6, wherein said vinyl cyanide monomer is selected from the group consisting of acrylonitrile and methacrylonitrile;

said unsaturated carboxylic acid alkyl ester of said copolymerizable monomer is selected from the group consisting of methylacrylate, methylmethacrylate, ethylacrylate, ethylmethacrylate, butylacrylate, and butylmethacrylate;

said unsaturated carboxylic acid hydroxyalkyl ester of said copolymerizable monomer is selected from the group consisting of β-hydroxyethyl acrylate, β-hydroxypropyl acrylate, and β-hydroxyethyl methacrylate;

said unsaturated carboxylic acid amide of said copolymerizable monomer is selected from the group consisting of acrylamide, methacrylamide, itaconamide, maleic acid monoamide and derivatives thereof; and said aromatic vinyl monomer of said copolymerizable monomer is selected from the group consisting of α-methylstyrene, vinyl toluene, and p-methyl styrene.

19. The polymer of claim 9, wherein said vinyl cyanide monomer is selected from the group consisting of acrylonitrile and methacrylonitrile;

said unsaturated carboxylic acid alkyl ester of said copolymerizable monomer is selected from the group consisting of methylacrylate, methylmethacrylate, ethylacrylate, ethylmethacrylate, butylacrylate, and butylmethacrylate;

said unsaturated carboxylic acid hydroxyalkyl ester of said copolymerizable monomer is selected from the group consisting of β-hydroxyethyl acrylate, β-hydroxypropyl acrylate, and β-hydroxyethyl methacrylate;

said unsaturated carboxylic acid amide of said copolymerizable monomer is selected from the group consisting of acrylamide, methacrylamide, itaconamide, maleic acid monoamide and derivatives thereof; and said aromatic vinyl monomer of said copolymerizable monomer is selected from the group consisting of α-methylstyrene, vinyl toluene, and p-methyl styrene.

* * * * *